United States Patent
Hahin et al.

(10) Patent No.: US 7,801,449 B2
(45) Date of Patent: Sep. 21, 2010

(54) OFF-MODULE OPTICAL TRANSCEIVER FIRMWARE PAGING

(75) Inventors: Jayne C. Hahin, Cupertino, CA (US); Gerald L. Dybsetter, Scotts Valley, CA (US); Luke M. Ekkizogloy, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 721 days.

(21) Appl. No.: 11/220,769

(22) Filed: Sep. 7, 2005

(65) Prior Publication Data
US 2006/0051098 A1  Mar. 9, 2006

Related U.S. Application Data

(60) Provisional application No. 60/607,746, filed on Sep. 7, 2004.

(51) Int. Cl.
*H04B 10/00* (2006.01)
*H04B 10/12* (2006.01)

(52) U.S. Cl. .......... 398/135; 398/140

(58) Field of Classification Search .......... 398/135, 398/140; 709/213; 712/248
See application file for complete search history.

(56) References Cited

U.S. PATENT DOCUMENTS

| | | | |
|---|---|---|---|
| 3,909,791 A | 9/1975 | Van Den Berg | |
| 4,093,988 A | 6/1978 | Scott | |
| 4,330,870 A | 5/1982 | Arends | |
| 4,745,573 A | 5/1988 | Lebel | |
| 4,947,411 A | 8/1990 | Shiraishi et al. | |
| 5,003,591 A | 3/1991 | Kauffman et al. | |
| 5,550,666 A | 8/1996 | Zirngibl | |
| 5,778,218 A | 7/1998 | Gulick | |
| 5,812,857 A * | 9/1998 | Nelson et al. | 717/173 |
| 5,845,077 A | 12/1998 | Fawcett | |
| 5,956,168 A | 9/1999 | Levinson et al. | |
| 5,994,940 A | 11/1999 | Kawasaki | |
| 6,081,888 A * | 6/2000 | Bell et al. | 712/248 |
| 6,449,075 B1 | 9/2002 | Watson et al. | |

(Continued)

FOREIGN PATENT DOCUMENTS

JP   59110227   6/1984

(Continued)

OTHER PUBLICATIONS

U.S. Appl. No. 11/220,765, Mail Date Jul. 16, 2008, Office Action.

(Continued)

*Primary Examiner*—Ken N Vanderpuye
*Assistant Examiner*—Daniel G Dobson
(74) *Attorney, Agent, or Firm*—Workman Nydegger

(57) ABSTRACT

An optical transceiver (or optical transmitter or optical receiver) that is coupled to a host computing system. The optical transceiver includes a system memory and at least one processor. The optical transceiver operates at least in part by the processor executing microcode from system memory. In order to change operation, the optical transceiver pages microcode segments from the host computing system to the system memory of the optical transceiver to adjust for changing operational circumstances. For example, by this paging, microcode segments that are more likely to be used given the current operational circumstances are loaded into the system memory of the optical transceiver, while microcode segments that are less likely to be used given the current operational circumstances are retained at the host computing system.

14 Claims, 2 Drawing Sheets

U.S. PATENT DOCUMENTS

| | | | |
|---|---|---|---|
| 6,735,731 | B2 | 5/2004 | Ewen et al. |
| 6,862,322 | B1 | 3/2005 | Ewen et al. |
| 7,080,245 | B2 | 7/2006 | Ballard et al. |
| 7,146,412 | B2 | 12/2006 | Turnbull |
| 7,249,353 | B2 | 7/2007 | Zarco |
| 7,269,191 | B2 * | 9/2007 | Stewart et al. ............... 372/34 |
| 7,313,681 | B2 * | 12/2007 | Chen et al. ................... 713/2 |
| 7,606,486 | B2 | 10/2009 | Dybsetter et al. |
| 2002/0027688 | A1 | 3/2002 | Stephenson |
| 2002/0112070 | A1 | 8/2002 | Ellerbrock et al. |
| 2002/0176131 | A1 | 11/2002 | Walters et al. |
| 2002/0176138 | A1 | 11/2002 | Schlanger |
| 2003/0002108 | A1 | 1/2003 | Ames et al. |
| 2003/0152390 | A1 * | 8/2003 | Stewart et al. ............ 398/135 |
| 2003/0154282 | A1 * | 8/2003 | Horvitz .................... 709/226 |
| 2004/0017794 | A1 | 1/2004 | Trachewsky |
| 2004/0022537 | A1 | 2/2004 | Mecherle et al. |
| 2004/0052528 | A1 | 3/2004 | Halgren et al. |
| 2004/0103347 | A1 * | 5/2004 | Sneed et al. ................. 714/32 |
| 2004/0136422 | A1 | 7/2004 | Mahowald et al. |
| 2004/0136720 | A1 | 7/2004 | Mahowald et al. |
| 2004/0151073 | A1 | 8/2004 | Preisach |
| 2004/0202476 | A1 | 10/2004 | Woolf et al. |
| 2004/0260798 | A1 | 12/2004 | Addinton et al. |
| 2005/0044335 | A1 | 2/2005 | Bee et al. |
| 2005/0132349 | A1 | 6/2005 | Roberts et al. |
| 2006/0051049 | A1 | 3/2006 | Hahin |
| 2006/0092051 | A1 | 5/2006 | Dybsetter et al. |
| 2006/0093370 | A1 | 5/2006 | Ekkizogloy et al. |
| 2006/0093371 | A1 | 5/2006 | Hahin et al. |

OTHER PUBLICATIONS

U.S. Appl. No. 11/220,765, Mail Date Mar. 19, 2008, Office Action.
U.S. Appl. No. 11/119,447, Mail Date Jun. 23, 2006, Office Action.
U.S. Appl. No. 11/119,447, Mail Date Nov. 29, 2006, Office Action.
U.S. Appl. No. 11/119,447, Mail Date Jul. 6, 2007, Office Action.
U.S. Appl. No. 11/119,447, Mail Date Apr. 8, 2008, Office Action.
U.S. Appl. No. 11/119,447, Mail Date Dec. 5, 2008, Office Action.
U.S. Appl. No. 11/119,447, Mail Date Jun. 8, 2009, Notice of Allowance.
U.S. Appl. No. 11/220,765, Mail Date Jan. 28, 2009, Final Office Action.
U.S. Appl. No. 11/220,765, Mail Date Oct. 26, 2009, Final Office Action.
U.S. Appl. No. 11/256,290, Mail Date Feb. 19, 2008, Office Action.
U.S. Appl. No. 11/256,290, Mail Date Sep. 3, 2008, Office Action.
U.S. Appl. No. 11/256,290, Mail Date Apr. 6, 2009, Office Action.
U.S. Appl. No. 11/256,290, Mail Date Dec. 29, 2009, Office Action.
U.S. Appl. No. 11/256,290, Mail Date Mar. 19, 2010, Notice of Allowance.
U.S. Appl. No. 11/256,329, Mail Date Apr. 8, 2008, Office Action.
U.S. Appl. No. 11/256,329, Mail Date Dec. 9, 2008, Office Action.
U.S. Appl. No. 11/256,329, Mail Date Aug. 13, 2009, Office Action.
U.S. Appl. No. 11/256,498, Mail Date Apr. 2, 2008, Office Action.
U.S. Appl. No. 11/256,498, Mail Date Dec. 17, 2008, Office Action.
U.S. Appl. No. 11/256,498, Mail Date Aug. 13, 2009, Office Action.
U.S. Appl. No. 11/256,498, Mail Date Mar. 26, 2010, Office Action.

* cited by examiner

OFF-MODULE OPTICAL TRANSCEIVER FIRMWARE PAGING

CROSS-REFERENCE TO RELATED APPLICATIONS

This application claims the benefit of U.S. Provisional Application No. 60/607,746, filed Sep. 7, 2004, which is incorporated herein by reference in its entirety.

BACKGROUND OF THE INVENTION

1. The Field of the Invention

The present invention relates generally to optical transmitters, receivers, and transceivers. More specifically, the present invention relates to optical transmitters, receivers and transceivers that change operation in response to dynamically changing circumstances.

2. Background and Relevant Art

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed through it, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (e.g., referred to as a "laser driver" when used to drive a laser) configured to control the operation of the optical transmitter in response to various control inputs. The optical transceiver also generally includes an amplifier (e.g., often referred to as a "post-amplifier") configured to amplify the channel-attenuated received signal prior to further processing. A controller circuit (hereinafter referred to the "controller") controls the operation of the laser driver and post-amplifier.

Controllers are typically implemented in hardware as state machines. Their operation is fast, but inflexible. Being primarily state machines, the functionality of the controller is limited to the hardware structure of the controller. Nevertheless, the variety of circumstances that an optical transceiver may face may vary widely over time. Accordingly, what would be advantageous are optical transmitters, receivers, and transceivers that have more flexible control to adjust to the dynamically changing circumstances.

BRIEF SUMMARY OF THE INVENTION

The foregoing problems with the prior state of the art are overcome by the principles of the present invention, which relate to an optical transceiver (or optical transmitter or optical receiver) that is coupled to a host computing system. The optical transceiver includes a system memory and at least one processor. The optical transceiver operates at least in part by the processor executing microcode from system memory. In order to change operation, the optical transceiver pages microcode segments from a host computing system to the system memory of the optical transceiver to adjust for changing operational circumstances. For example, by this paging, microcode segments that are more likely to be used given the current operational circumstances are loaded into the system memory of the optical transceiver, while microcode segments that are less likely to be used given the current operational circumstances are retained at the host computing system.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The principles of the present invention relate to an optical transceiver (or an optical transmitter or receiver) that receives microcode segments from a host computing system (hereinafter referred to simply as a "host"). The optical transceiver includes a system memory and a processor. The system memory receives the microcode segments from the host in response to changes in the operational circumstances of the optical transceiver. The processor executes the microcode, which causes the transceiver to adapt to the new operational circumstances. An example operational optical transceiver environment will first be described. Then, the operation in accordance with the invention will be described with respect to the operational environment.

Figure 1:
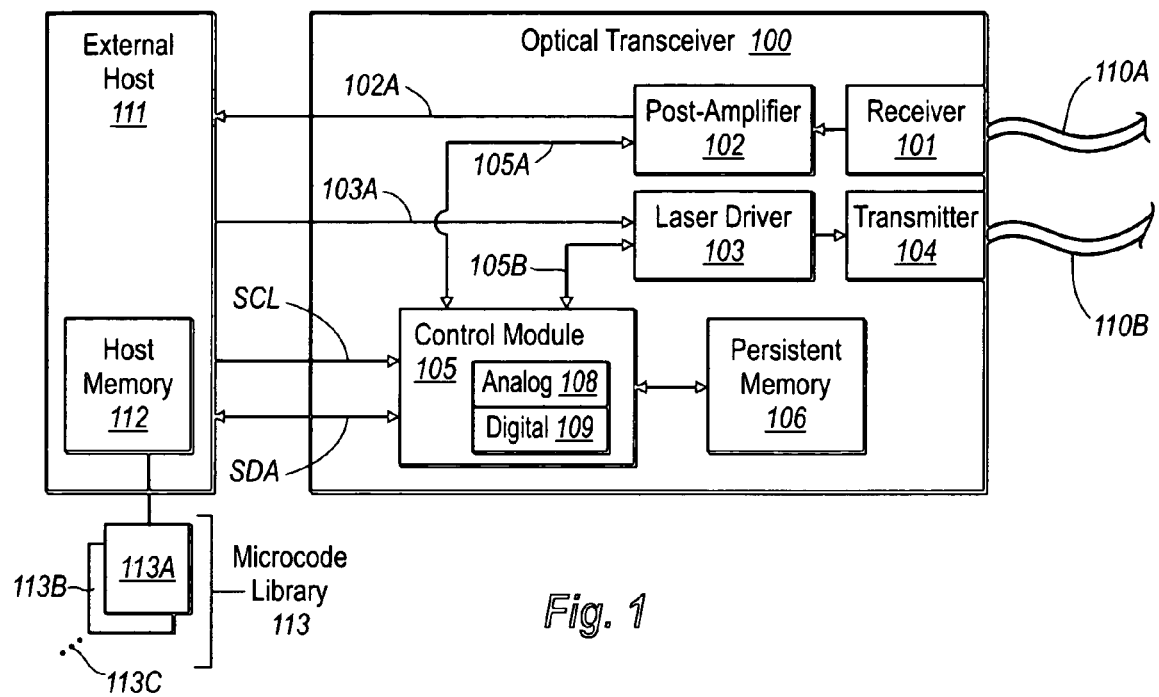
FIG. 1 schematically illustrates an example of an optical transceiver that may implement features of the present invention.

FIG. 1 illustrates an optical transceiver 100 in which the principles of the present invention may be employed. While the optical transceiver 100 will be described in some detail, the optical transceiver 100 is described by way of illustration only, and not by way of restricting the scope of the invention. The principles of the present invention are suitable for 1G, 2G, 4G, 8G, 10G and higher bandwidth fiber optic links. Furthermore, the principles of the present invention may be implemented in optical (e.g., laser) transmitter/receivers of any form factor such as XFP, SFP and SFF, without restriction. Having said this, the principles of the present invention are not limited to an optical transceiver environment at all.

The optical transceiver 100 receives an optical signal from fiber 110A using receiver 101. The receiver 101 acts as an opto-electric transducer by transforming the optical signal into an electrical signal. The receiver 101 provides the resulting electrical signal to a post-amplifier 102. The post-amplifier 102 amplifies the signal and provides the amplified signal to an external host 111 as represented by arrow 102A. The external host 111 may be any computing system capable of communicating with the optical transceiver 100. The external host 111 may contain a host memory 112 that may be a volatile or non-volatile memory source. In one embodiment, the optical transceiver 100 may be a printed circuit board or other components/chips within the host 111, although this is not required.

The optical transceiver 100 may also receive electrical signals from the host 111 for transmission onto the fiber 110B. Specifically, the laser driver 103 receives the electrical signal as represented by the arrow 103A, and drives the transmitter 104 (e.g., a laser or Light Emitting Diode (LED)) with signals that cause the transmitter 104 to emit onto the fiber 110B optical signals representative of the information in the electrical signal provided by the host 111. Accordingly, the transmitter 104 serves as an electro-optic transducer.

The behavior of the receiver 101, the post-amplifier 102, the laser driver 103, and the transmitter 104 may vary dynamically due to a number of factors. For example, temperature changes, power fluctuations, and feedback conditions may each affect the performance of these components. Accordingly, the optical transceiver 100 includes a control module 105, which may evaluate temperature and voltage conditions and other operational circumstances, and receive information from the post-amplifier 102 (as represented by arrow 105A) and from the laser driver 103 (as represented by arrow 105B). This allows the control module 105 to optimize the dynamically varying performance, and additionally detect when there is a loss of signal.

Specifically, the control module 105 may counteract these changes by adjusting settings on the post-amplifier 102 and/or the laser driver 103 as also represented by the arrows 105A and 105B. These settings adjustments are quite intermittent since they are only made when temperature or voltage or other low frequency changes so warrant. Receive power is an example of such a low frequency change.

The control module 105 may have access to a persistent memory 106, which in one embodiment, is an Electrically Erasable and Programmable Read Only Memory (EEPROM). The persistent memory 106 and the control module 105 may be packaged together in the same package or in different packages without restriction. Persistent memory 106 may also be any other non-volatile memory source.

Figure 2:
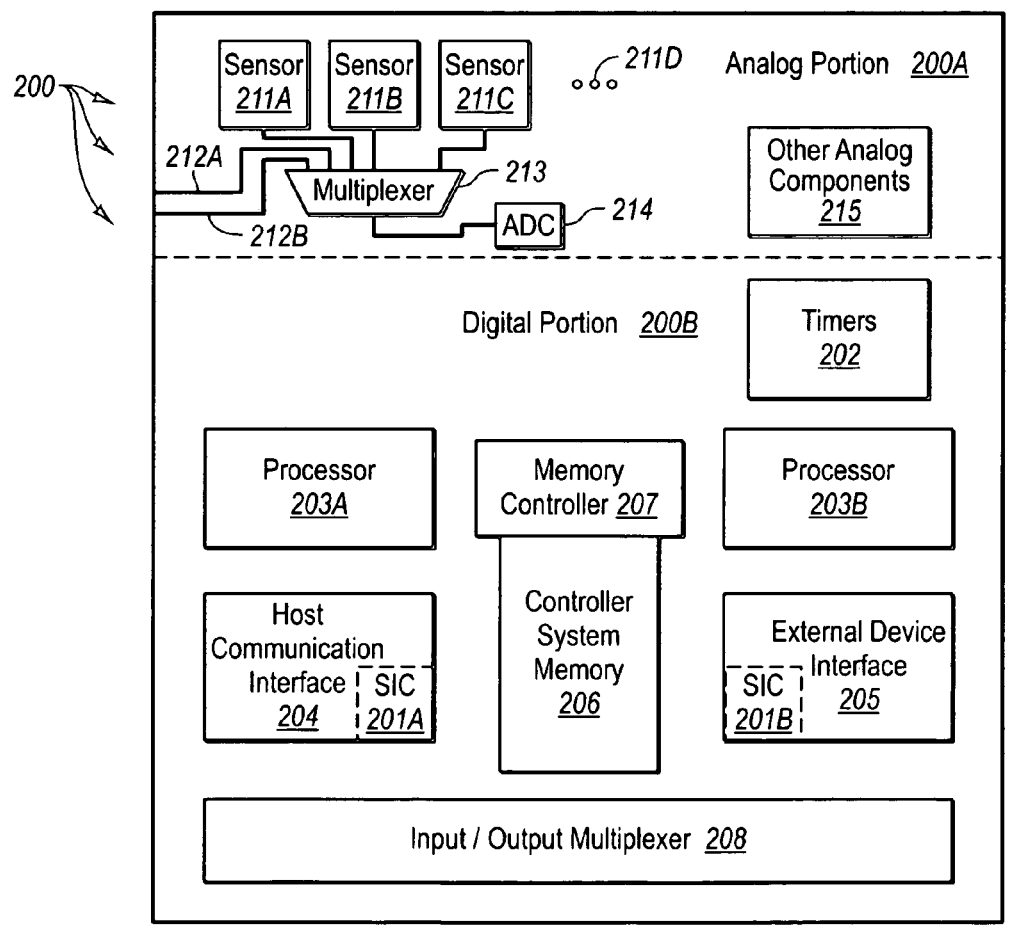
FIG. 2 schematically illustrates an example of a control module of FIG. 1.

The control module 105 includes both an analog portion 108 and a digital portion 109. Together, they allow the control module to implement logic digitally, while still largely interfacing with the rest of the optical transceiver 100 using analog signals. FIG. 2 schematically illustrates an example 200 of the control module 105 in farther detail. The control module 200 includes an analog portion 200A that represents an example of the analog portion 108 of FIG. 1, and a digital portion 200B that represents an example of the digital portion 109 of FIG. 1.

For example, the analog portion 200A may contain digital to analog converters, analog to digital converters, high speed comparators (e.g., for event detection), voltage based reset generators, voltage regulators, voltage references, clock generator, and other analog components. For example, the analog portion 200A includes sensors 211A, 211B, 211C amongst potentially others as represented by the horizontal ellipses 211D. Each of these sensors may be responsible for measuring operational parameters that may be measured from the control module 200 such as, for example, supply voltage and transceiver temperature. The control module may also receive external analog or digital signals from other components within the optical transceiver that indicate other measured parameters such as, for example, laser bias current, transmit power, receive power, laser wavelength, laser temperature, and Thermo Electric Cooler (TEC) current. Two external lines 212A and 212B are illustrated for receiving such external analog signals although there may be many of such lines.

The internal sensors may generate analog signals that represent the measured values. In addition, the externally provided signals may also be analog signals. In this case, the analog signals are converted to digital signals so as to be available to the digital portion 200B of the control module 200 for further processing. Of course, each analog parameter value may have its own Analog to Digital Converter (ADC). However, to preserve chip space, each signal may be periodically sampled in a round robin fashion using a single ADC such as the illustrated ADC 214. In this case, each analog value may be provided to a multiplexer 213, which selects in a round robin fashion, one of the analog signals at a time for sampling by the ADC 214. Alternatively, multiplexer 213 may be programmed to allow any order of analog signals to be sampled by ADC 214.

As previously mentioned, the analog portion 200A of the control module 200 may also include other analog components 215 such as, for example, digital to analog converters, other analog to digital converters, high speed comparators (e.g., for event detection), voltage based reset generators, voltage regulators, voltage references, clock generator, and other analog components.

The digital portion 200B of the control module 200 may include a timer module 202 that provides various timing signals used by the digital portion 200B. Such timing signals may include, for example, programmable processor clock signals. The timer module 202 may also act as a watchdog timer.

Two general-purpose processors 203A and 203B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 203A and 203B are each a 16-bit processor and may be identically structured. The precise structure of the instruction set is not important to the principles of the present invention as the instruction set may be optimized around a particular hardware environment, and as the precise hardware environment is not important to the principles of the present invention.

A host communications interface 204 is used to communicate with the host 111, possibly implemented using a two-wire interface such as I²C shown in FIG. 1 as the serial data (SDA) and serial clock (SCL) lines on the optical transceiver 100. Other host communication interfaces may also be implemented as well. Data may be provided from the control module 105 to the host 111 using this host communications interface to allow for digital diagnostics and readings of temperature levels, transmit/receiver power levels, and the like. The external device interface 205 is used to communicate with, for example, other modules within the optical transceiver 100 such as, for example, the post-amplifier 102, the laser driver 103, or the persistent memory 106.

The internal controller system memory 206 (not to be confused with the external persistent memory 106) may be Random Access Memory (RAM) or non-volatile memory. The memory controller 207 shares access to the controller system memory 206 amongst each of the processors 203A and 203B and with the host communication interface 204 and the external device interface 205. In one embodiment, the host communication interface 204 includes a serial interface controller 201A, and the external device interface 205 includes a serial interface controller 201B. The two serial interface controllers 201A and 201B may communicate using a two-wire interface such as I²C or another interface so long as the interface is recognized by both communicating modules. One serial interface controller (e.g., serial interface controller 201B) is a master component, while the other serial interface controller (e.g., serial interface controller 201A) is a slave component.

An input/output multiplexer 208 multiplexes the various input/output pins of the control module 200 to the various components within the control module 200. This enables different components to dynamically assign pins in accordance with the then-existing operational circumstances of the control module 200. Accordingly, there may be more input/output nodes within the control module 200 than there are pins available on the control module 200, thereby reducing the footprint of the control module 200.

Having described a specific environment with respect to FIGS. 1 and 2, it will be understood that this specific environment is only one of countless architectures in which the principles of the present invention may be employed. As previously stated, the principles of the present invention are not intended to be limited to any particular environment. Accordingly, the principles of the present invention relate to an optical transceiver (or transmitter or receiver) capable of paging microcode from a host computing system in response to changing operational circumstances. The principles of the present invention will be discussed with reference to the environment described in relation to FIGS. 1 and 2.

Referring again to FIG. 2, a controller system memory 206, which was described in detail above, is shown. Microcode from other sources (e.g., persistent memory 106 or host memory 112) may be loaded by the processors 203 into controller system memory 206 for execution. However, the amount of memory in controller system memory may not be large. Only a limited amount of microcode may be loaded into the controller system memory 206 at a given time. Accordingly, only a limited amount of microcode may be executed from controller system memory 206 at a given time. This may be problematic for an optical transceiver for which more complex functionality is desired.

One solution would be to make controller system memory 206 larger. However, this may be very expensive. Additionally, making controller system memory 206 larger may adversely impact the overall size of transceiver 100. The present invention provides for a mechanism that allows for larger libraries of microcode to be accessed from controller system memory 206 without increasing system memory size. This is accomplished through the use of "microcode segment paging". "Microcode segment paging" is defined as the act of transferring microcode segments from the external host and the transceiver as circumstances may warrant. Optionally, microcode segments may be returned back to the host computing system if desired as part of microcode segment paging, or simple memory deallocation may suffice as well once the optical transceiver is done with a particular microcode segment in a memory location to be deallocated.

Referring to FIG. 1, the transceiver 100 is communicatively coupled to the host 111 that includes a host memory 112 which may be capable of storing microcode. For example, host memory 112 may contain a library of different microcode (seen as microcode library 113 including microcode segments 113A, 113B amongst potentially many more as illustrated by the ellipses 113C). Each of the microcode segments may allow the optical transceiver 100 to perform different operational functions when executed by the processors 203. This library of different microcode 113 may have been accessed by the host from a remote network site, although this is not required.

Figure 3:
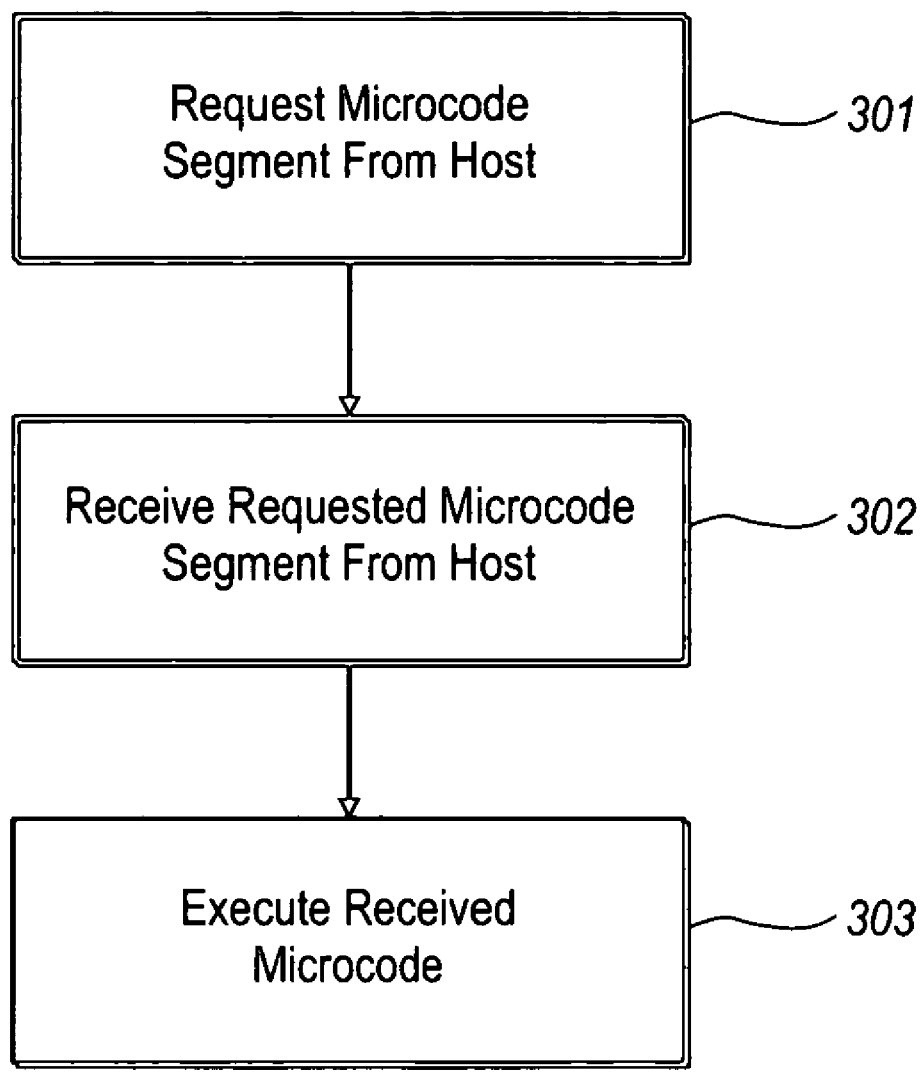
FIG. 3 illustrates a flowchart of a method for paging microcode segments from a host computing system to a system memory of an optical transceiver for execution by the optical transceiver in accordance with the principles of the invention.

FIG. 3 illustrates a flowchart of a method 300 for paging microcode segments from the host computing system for execution by the optical transceiver to, for example, adjust for changing operational circumstances. For microcode segments to be paged, the optical transceiver requests the microcode segment(s) from the host computing system (act 301). This request may be accomplished using any communication mechanism available between the optical transceiver 100 and the external host 111. However, in the illustrated embodiment of FIG. 1 in which the I²C two-wire interface protocol is used, the request may be sent using the SDA line, with proper synchronization provided by clock signals on the SCL line. This request may be initiated upon the optical transceiver determining that the circumstances are appropriate for receiving and executing the new microcode segment. The microcode segment may be expressly identified in the request, or the request may simply contain sufficient information that the host computing system may identify the requested microcode segment.

The optical transceiver 100 thus receives the requested microcode segment(s) from the host computing system 111 (act 302). This may be also accomplished using any communication mechanism available. However, in the illustrated embodiment of FIG. 1, the microcode segments may be sent using the SDA line, with proper synchronization provided by clock signals on the SCL line. The microcode may be received into controller system memory 206 for immediate execution (act 303). The microcode may also be received into persistent memory 106 and later loaded into controller system memory 206 for execution (act 303). The host 111 may also use this same interface to receive microcode segments paged from the optical transceiver 100 to the host memory 112 if the microcode segments are to be returned for some reason.

As a first example, transceiver 100 may contain microcode that is used to initialize transceiver operational functions at the time transceiver 100 begins operation. This microcode, when executed, may determine the initial values of such operational parameters as operating voltage, laser driver 103 bias current, transmitter 104 output power and the like. However, optical transceiver 100 may be configured to recognize the end of the initialization process and to request that new microcode be sent by external host 111 over the SDA and SCL lines to controller system memory 206 when post-initialization normal operation is to begin.

As another example, during transceiver 100 operation, it may be desirable to perform diagnostics periodically. The transceiver 100 may request and receive diagnostics microcode segment(s) to the optical transceiver that, when executed, directs the diagnostics.

As a third example, the host 111 may be able to monitor the life cycle of transceiver 100. When the transceiver nears the end of its operable life, the transceiver 100 may request and receive new "end-of-life" microcode segment(s), once again over the SDA and SCL lines. There may also be numerous other changing operational circumstances that may prompt the optical transceiver to request microcode segments.

If there is insufficient optical transceiver memory to receive the microcode segment(s), the optical transceiver may deallocate memory holding lesser-used microcode segments to free up sufficient memory resources for the new microcode segments that are about to be received.

Referring to FIGS. 1 and 2, control module 105 executes the microcode received from host 111 (act 303). In the illustrated example, processors 203 load microcode from host 111 into the controller system memory 206. Alternatively, the processors 203 may load microcode stored in persistent memory 106 into controller system memory 206 if host 111 sent the microcode to persistent memory 106 originally. The processors 203 execute the microcode, causing the microcode to change the operational performance of transceiver 100. For example, executing the microcode sent at the end of the initialization period may cause new operational parameters such as laser bias current and transmit power to be implemented. Additionally, processors 203 may execute the diagnostics microcode described earlier. This would cause transceiver 100 to perform the designated diagnostics. In like manner, the processors 203 may execute the end of life cycle microcode. As transceiver 100 operates for a long period of time, it may need different operational parameters to prolong the life cycle. The end of life cycle microcode may be structured to implement these new operational parameters.

Once the microcode has been executed (act 303), controller system memory 206 may deallocate the memory that stores the microcode if circumstances warrant. For example, keeping memory allocated for initialization microcode in controller system memory 206 or persistent memory 106 after the initialization period would be a waste of precious transceiver 100 memory. The transceiver 100 may be configured to recognize the end of the initialization process. On recognizing the end of the process, controller system memory 206 could send deallocate that memory so that other microcode may be written in that memory location. This process would also apply to other microcode as well. For example, once the diagnostic process discussed above was complete, transceiver 100 or host 111 could direct that the memory holding the diagnostic microcode be deallocated.

This process ensures that controller system memory 206 is used in an efficient manner. Microcode is only maintained in controller system memory 206 during execution. Once execution is complete, the microcode is written over. However, if the microcode is needed at a later time, then optical transceiver 100 may still request that microcode from the host 111 when needed. For example, if the diagnostic discussed above was desired at a later time, the diagnostic microcode could be resent to controller system memory 206 and executed.

The paging process may be repeated for multiple memory segments. Furthermore, unless optical transceiver memory has been exhausted, there is no need for the method 300 to be completed for some requested memory segments before the method 300 is begun for other memory segments. For instance, while the optical transceiver is executing post-initialization normal operation microcode (act 303) that will later be paged in favor of end-of-life microcode, the optical transceiver may request (act 301) and receive (act 302) diagnostics microcode for execution (act 302) in order to perform diagnostics.

It may also be possible that changing operational circumstances will not warrant that the memory associated with the received microcode ever be deallocated. For example, the end of life cycle microcode may be needed for the remaining operational time period of transceiver 100. In that case, the microcode remains in controller system memory 206 for continued execution.

A specific embodiment of the present invention will be described with reference to the environment described in FIGS. 1 and 2. Suppose that controller system memory 206 was executing microcode that was structured to implement transceiver operational functions at an operating temperature between 70° C. and 80° C. As mentioned previously, control module analog portion 200A contains sensors 211, one of which may be a temperature sensor. This temperature sensor may detect that the actual operating temperature was 72° C. Sensor 211 would send an analog signal of the temperature through multiplexer 213 to ADC 214. ADC 214 would convert the analog signal to a digital signal and send it to the processors 203. The optical transceiver may determine that new microcode is needed for transceiver 100.

The optical transceiver would then send a request for new microcode from the host 111. For example, host memory 112 may contain microcode structured to implement transceiver operational functions at temperatures between 65° C. to 75° C. Such microcode may include, for example, temperature tables or formulas mapping the current temperature to certain temperature-dependent operational parameters such as, for example, laser bias current. This microcode would be sent to controller system memory 206 over the SDA and SCL lines as discussed previously.

Alternatively, the optical transceiver may simply report the current temperature to the host 111. The host 111 may then make a determination that a new microcode segment should be paged to the optical transceiver 100 to address changing temperature ranges. In that context, the reporting of the temperature may be considered as a "request" for new microcode, as the term "request" is to be interpreted in this description and in the claims. Either way, the new microcode segment for 65° C. to 75° C. would be sent to the optical transceiver 100.

Processors 203 would execute the new microcode in controller system memory 206. This would cause transceiver 100 to operate under the new operational functions. If at a later time, sensor 211 detected the temperature returning to 74° C., then processors 203 would communicate the temperature to host 111. Host 111 would resend the 70° C. to 80° C. microcode to controller system memory 206. The new microcode would be executed and the operational functions would change. This process could be repeated every time the temperature changed. The paging process could also be repeated as often as necessary for any microcode segment contained by host 111 and controller system memory 206. Accordingly, in this example, the transceiver 100 would only carry (at any given time) temperature tables or other temperature-related microcode for temperature ranges that are much narrower than the full range of potential operating temperatures.

The principles of the present invention provide for an optical transceiver with many benefits over current optical transceivers. Specifically, the present invention allows for offtransceiver microcode paging. Only microcode that is more likely to be used is loaded into the transceiver system memory. This allows for a small amount of transceiver system memory to implement a large number of microcode segments. Accordingly, the principles of the present invention represent a significant advancement in the art of optical transceivers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. In an optical transceiver that is communicatively coupled to a host computing system, the optical transceiver including a system memory and at least one processor, a method for paging microcode segments from the host computing system to system memory of the optical transceiver, the method comprising the following:

an act of the optical transceiver requesting a first microcode segment from the host computing system in response to changing operational circumstances of the optical transceiver including at least one of a life cycle change in the optical transceiver, a temperature change in the optical transceiver, and a transition from completion of a process executed using a second microcode segment in the system memory to a process requiring the requested first microcode segment;

an act of the optical transceiver receiving the requested first microcode segment from the host computing system;

an act of the at least one processor executing the first microcode segment from the system memory, wherein the first microcode segment is structured such that, when executed by the at least one processor, the optical transceiver is adaptive towards the changing operational circumstances; and an act of returning the first microcode segment to the host computing system if the first microcode segment is less likely to be used relative to other microcode segments given the changing operational circumstances.

2. A method in accordance with claim 1, wherein the first microcode segment is structured such that, when executed by the at least one processor, the optical transceiver performs initialization functions.

3. A method in accordance with claim 1, wherein the first microcode segment is structured such that, when executed by the at least one processor, the optical transceiver performs diagnostics.

4. A method in accordance with claim 1, wherein the first microcode segment is structured such that, when executed by the at least one processor, the optical transceiver performs normal operation functions.

5. A method in accordance with claim 1, wherein the first microcode segment is structured such that, when executed by the at least one processor, the optical transceiver performs end-of-life operation functions.

6. A method in accordance with claim 1, wherein first the microcode segment is structured such that, when executed by the at least one processor, the optical transceiver performs an operation appropriate for a certain temperature range.

7. A method in accordance with claim 1, further comprising the following: an act of the optical transceiver returning one or more microcode segments to the host computing system prior to the act of the optical transceiver receiving the requested first microcode segment from the host computing system.

8. A method in accordance with claim 1, further comprising the following:

an act of the optical transceiver requesting a new microcode segment from the host computing system;

an act of the optical transceiver receiving the new requested microcode segment from the host computing system; and an act of the at least one processor of the optical transceiver executing the new microcode segment from the system memory.

9. A method in accordance with claim 8, wherein the act of the optical transceiver receiving the new requested microcode segment occurs after the act of the at least one processor of the optical transceiver executing the first microcode segment.

10. A method in accordance with claim 8, wherein the act of the optical transceiver receiving the new requested microcode segment occurs after the act of the optical transceiver receiving the first microcode segment, but before completing the act of the at least one processor of the optical transceiver executing the first microcode segment.

11. A method in accordance with claim 1, wherein microcode segments are requested based on an associated likelihood of use given the changing operational circumstances and wherein microcode segments that are less likely to be used relative to other microcode segments given the changing operational circumstances are retained at the host computing system.

12. A method in accordance with claim 1, further comprising:

an act of maintaining the system memory such that sufficient memory resources are freed up to receive the requested first microcode segment.

13. A method in accordance with claim 1, further comprising:

repeating the acts of requesting and receiving a new microcode segment while the act of executing the previously received first microcode segment is performed.

14. A method in accordance with claim 1, further comprising:

deallocating a portion of the system memory in which the second microcode segment is stored upon completion of the process executed using the second microcode segment.

* * * * *